(12) United States Patent
Kang et al.

(10) Patent No.: US 8,300,389 B2
(45) Date of Patent: Oct. 30, 2012

(54) MODULE FOR EXPANDING FUNCTION OF MOBILE DEVICE AND MOBILE DEVICE HAVING THE SAME

(75) Inventors: Laio Kang, Gyeonggi-Do (KR); Taegyun Lee, Seoul (KR); Aram Moon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 12/857,913

(22) Filed: Aug. 17, 2010

(65) Prior Publication Data
US 2011/0216485 A1 Sep. 8, 2011

(30) Foreign Application Priority Data
Mar. 5, 2010 (KR) ........................ 10-2010-0020122

(51) Int. Cl.
*G06F 1/16* (2006.01)
(52) U.S. Cl. ................................... 361/679.01
(58) Field of Classification Search .............. 361/679.01
See application file for complete search history.

(56) References Cited

U.S. PATENT DOCUMENTS

| | | | | |
|---|---|---|---|---|
| 6,109,528 A | * | 8/2000 | Kunert et al. ............ | 235/472.01 |
| 6,327,152 B1 | * | 12/2001 | Saye ............................ | 361/732 |
| 6,785,127 B1 | * | 8/2004 | Monney et al. .......... | 361/679.01 |
| 6,842,332 B1 | * | 1/2005 | Rubenson et al. ....... | 361/679.09 |
| 6,922,333 B2 | * | 7/2005 | Weng et al. ................ | 361/679.2 |
| 7,103,698 B2 | * | 9/2006 | Zhang et al. .................... | 710/303 |
| 7,352,567 B2 | * | 4/2008 | Hotelling et al. ........ | 361/679.55 |
| 7,715,187 B2 | * | 5/2010 | Hotelling et al. ........ | 361/679.41 |
| 7,916,467 B2 | * | 3/2011 | Hotelling et al. ........ | 361/679.41 |
| 2006/0285283 A1 | * | 12/2006 | Simonian et al. ............. | 361/679 |
| 2008/0232061 A1 | * | 9/2008 | Wang et al. .................... | 361/686 |
| 2008/0259552 A1 | * | 10/2008 | Calvarese ..................... | 361/684 |
| 2009/0103249 A1 | * | 4/2009 | Strat et al. ............... | 361/679.01 |
| 2010/0131691 A1 | * | 5/2010 | Chatterjee et al. ............ | 710/303 |
| 2010/0194503 A1 | * | 8/2010 | Eromaki ........................ | 335/219 |
| 2011/0026203 A1 | * | 2/2011 | Ligtenberg et al. ...... | 361/679.01 |
| 2011/0194232 A1 | * | 8/2011 | Saila ........................ | 361/679.01 |

FOREIGN PATENT DOCUMENTS
KR 10-2009-0068739 6/2009
* cited by examiner

*Primary Examiner* — Lisa Lea Edmonds
(74) *Attorney, Agent, or Firm* — Morgan, Lewis & Bockius LLP

(57) ABSTRACT

A mobile device includes a main body having a coupling element mounted thereon, and an expansion module electrically connected to the main body, wherein the expansion module comprises a magnet disposed to apply a magnetic force to the coupling element to couple the expansion module with the main body, and a movement converter configured to move the magnet away from the coupling element so as to decrease the magnetic force between the coupling element and the magnet thereby decoupling the main body from the expansion module.

17 Claims, 10 Drawing Sheets

MODULE FOR EXPANDING FUNCTION OF MOBILE DEVICE AND MOBILE DEVICE HAVING THE SAME

This application claims the benefit of Korean Patent Application No. 10-2010-0020122 filed on Mar. 5, 2010, which is hereby incorporated by reference.

BACKGROUND OF THE INVENTION

1. Field of the Invention

The present invention relates to an expansion module, and more particularly to a module for expanding a function of a mobile device and a mobile device having the same.

2. Discussion of the Related Art

Mobile devices include electronic devices which are portable and have at least one of voice and telephone call functions, information input and/or output functions, a data storage function and the like. The mobile device can further capture still images or moving images, play music or video files, play games, receive broadcast and the like, so as to be implemented as an integrated multimedia player.

Various attempts to implement such complicated functions in the multimedia device have been made by hardware or software. However, the required portability of the mobile device requires reduced battery capacity in the mobile device and causes difficulty in installing components for providing various user interfaces.

SUMMARY OF THE INVENTION

Accordingly, the present invention is directed to a module for expanding a function of a mobile device and a mobile device having the same that substantially obviates one or more problems due to limitations and disadvantages of the related art.

An object of the present invention is to provide an expansion module, capable of expanding the function of a mobile device, and a mobile device having the same.

Another object of the present invention is to provide a mechanism for facilitating coupling and separation between an expansion module and a mobile device main body.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the module for expanding a function of a mobile device and a mobile device having the same includes a main body having a coupling element mounted thereon, and an expansion module electrically connected to the main body, wherein the expansion module comprises a magnet disposed to apply a magnetic force to the coupling element to couple the expansion module with the main body, and a movement converter configured to move the magnet away from the coupling element so as to decrease the magnetic force between the coupling element and the magnet thereby decoupling the main body from the expansion module.

In another aspect, the expansion module for a mobile device includes an expansion body detachably coupled to one surface of the mobile device, a magnet disposed at the expansion body to apply a magnetic force to a coupling element in the mobile device thereby coupling the expansion body with the mobile device, and a movement converter configured to move the magnet away from the coupling element so as to decrease the magnetic force between the coupling element and the magnet thereby decoupling the mobile device from the expansion body.

In another aspect, the expansion module for a mobile device includes a first coupling element configured to be coupled to a second coupling element disposed at the mobile device, and a manipulation member configured to decouple the first coupling element and the second coupling element by converting a linear motion of the manipulation member to a rotary motion of the second coupling element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
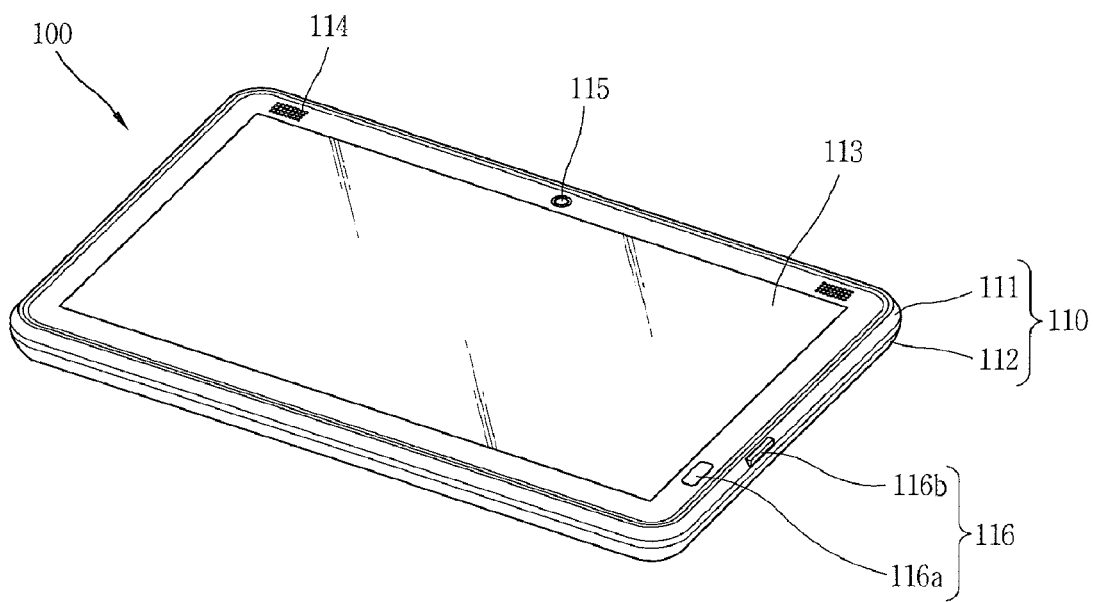
FIG. 1 is a perspective view of a mobile device in accordance with an exemplary embodiment according to the present invention.

Reference will now be made in detail to the preferred embodiments of the present invention, examples of which are illustrated in the accompanying drawings.

Description will now be given in detail of preferred configurations of mobile devices according to the present invention, with reference to the accompanying drawings. Hereinafter, suffixes "module" and "unit or portion" for components used herein in description are merely provided for facilitation of preparing this specification, and thus they are not granted a specific meaning or function. Hence, it should be noticed that "module" and "unit or portion" can be used together.

This specification employs similar reference numerals for similar components irrespective of different embodiments, so that they could be understood by the first description. The expression in the singular form in this specification will cover the expression in the plural form unless otherwise indicated obviously from the context. Mobile devices described in the present invention may include laptop computers, tablet PCs, smart phones, digital broadcasting terminals, personal digital assistants (PDAs), portable multimedia players (PMPs), navigators, and the like.

FIG. 1 is a perspective view of a mobile device 100 in accordance with an exemplary embodiment according to the present invention, which shows a tablet PC as one example of a mobile device. The disclosed mobile device 100 includes one body (or main body) 110. However, with no limit to the configuration, the mobile device 100 may be applicable to various structures, such as mobile devices having at least two bodies coupled to each other to be relatively movable.

A body may include a case (housing, casing, cover, etc.) forming the outside of the mobile device 100. In this exemplary embodiment, the case is formed by a front case 111 and a rear case 112. In addition, various electronic components may be disposed in a space between the front case 111 and the rear case 112. At least one intermediate case may additionally be disposed between the front case 111 and the rear case 112. Further, the cases can be formed of resin by injection molding, or formed using metallic materials, such as stainless steel (STS) or titanium (Ti).

A display unit 113, an audio output module 114, a camera 115, a user input unit 116 and the like may be disposed on the body, in particular, on the front case 111. The display unit 113 may occupy most of a principal surface of the front case 111. The display unit 113 may be configured to display visible information or image information. The display unit 113 may include at least one of a Liquid Crystal Display (LCD), a Thin Film Transistor-LCD (TFT-LCD), an Organic Light Emitting Diode (OLED) display, a flexible display, or a three-dimensional (3D) display. The display unit 113 may include a touchpad for allowing a user's touch input. In this case, the display unit 113 may operate as a touch screen.

The display unit 113 may output various types of visual information. Such information may be output in various forms of letter, number, symbol, graphic, icon or the like. For input of such information, at least one of the letters, the numbers, the symbols, the graphics or the icons may be displayed in a present arrangement, thereby implementing a type of keypad, which may be called as "soft key." The display unit may operate as an overall region, or by being divided into plural regions. For the latter, the plurality of regions may be configured to cooperatively operate together.

The user input unit 116 may be manipulated to receive commands for controlling operations of the mobile device 100, and include a plurality of manipulation units 116a and 116b. The manipulation units 116a and 116b may also be referred to as a manipulating portion, which can be manipulated in any tactile manner that user can make a touch input. For example, the manipulation units 116a and 116b can be implemented as a keypad, a dome switch, a touchpad (e.g., static pressure/capacitance), a jog wheel, a jog switch and the like.

The information input via the plurality of manipulation units 116a and 116b may be set in various manners. For example, the first manipulation unit 116a may be used for input of commands, such as START, END, etc., and the second manipulation unit 116b may be used for reception of commands, such as SCROLL or the like, or commands, such as volume adjustment of sounds output from the audio output module 114.

The audio output module 114 and the camera 115 may be located at a region adjacent to one of both ends of the display unit 113. The audio output module 114 may include a speaker, a receiver, and the like. The camera 115 may be installed in an electronic device body to be rotatable or popped up. A controller for controlling the display unit 113 and the user input unit 116 may be disposed in the body. The controller may be implemented as a printed circuit board.

Figure 2:
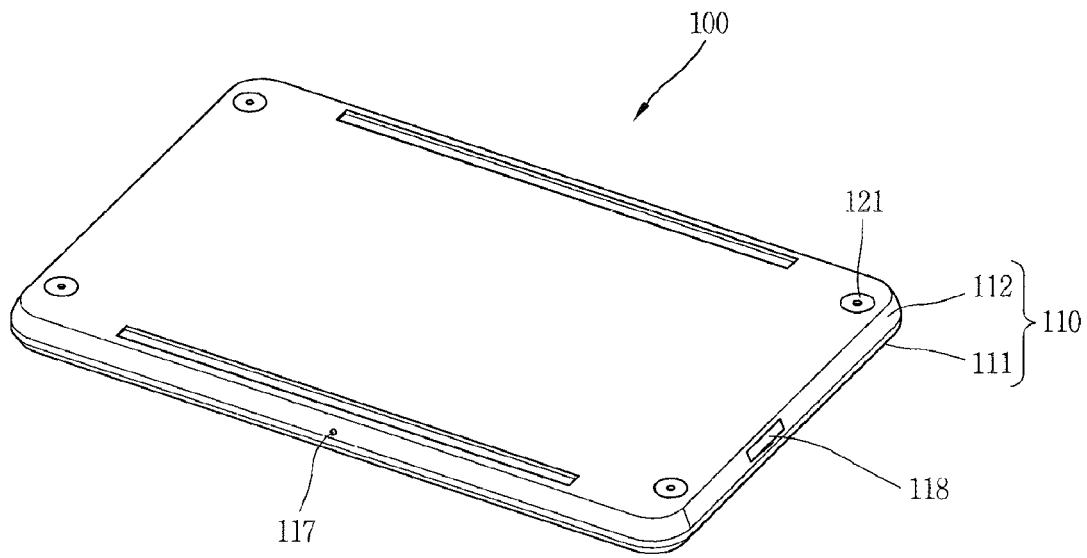
FIG. 2 is a rear perspective view of the mobile device of FIG. 1.

FIG. 2 is a rear perspective view of the mobile device 100 of FIG. 1. An audio output module may further be disposed at a rear surface of the mobile device body. The audio output module may cooperate with the audio output module 114 (see FIG. 1) to provide stereo output. Also, the audio output module may be configured to operate as a speakerphone.

A wireless communication or broadcast signal reception antenna (not shown) may be disposed at a side surface of the mobile device body. The antenna may be retractable into the mobile device body.

The mobile device body may include a microphone 117, an interface 118, and the like. The microphone 117 may be disposed at a region adjacent to a different end portion from one end portion having the audio output module 114.

The interface 118 and the like may be located at side surfaces of the front case 111 and the rear case 112. The interface 118 may be at least one of a connection terminal for wired or wireless connection to an earphone, a port for a short-range communication (e.g., infrared (IrDA) port, Bluetooth port, wireless LAN port, etc.), or power supply terminals for power supply to the mobile device. The interface 118 may also be a card socket for accommodating an external card such as Subscriber Identification Module (SIM), User Identity Module (UIM), memory card for storing information or the like. A power supply unit (not shown) for supplying power to the mobile device 100 may be mounted to the mobile device body. The power supply unit may be a built-in battery, so as to be mounted inside the body.

A coupling element 121 may be externally exposed from one surface of the rear case 112. The coupling element 121, for example, may allow one member disposed in the body or the front case 111 to be coupled to the rear case 112. The coupling element 121 may be configured as a bolt, pin or the like. The one member may be a printed circuit board, an injected structure or the like. Although the present invention is not limited to this exemplary embodiment, the coupling element 121 may be made of a magnetic material so as to be attracted to a magnetic force of a magnet.

Figure 3:
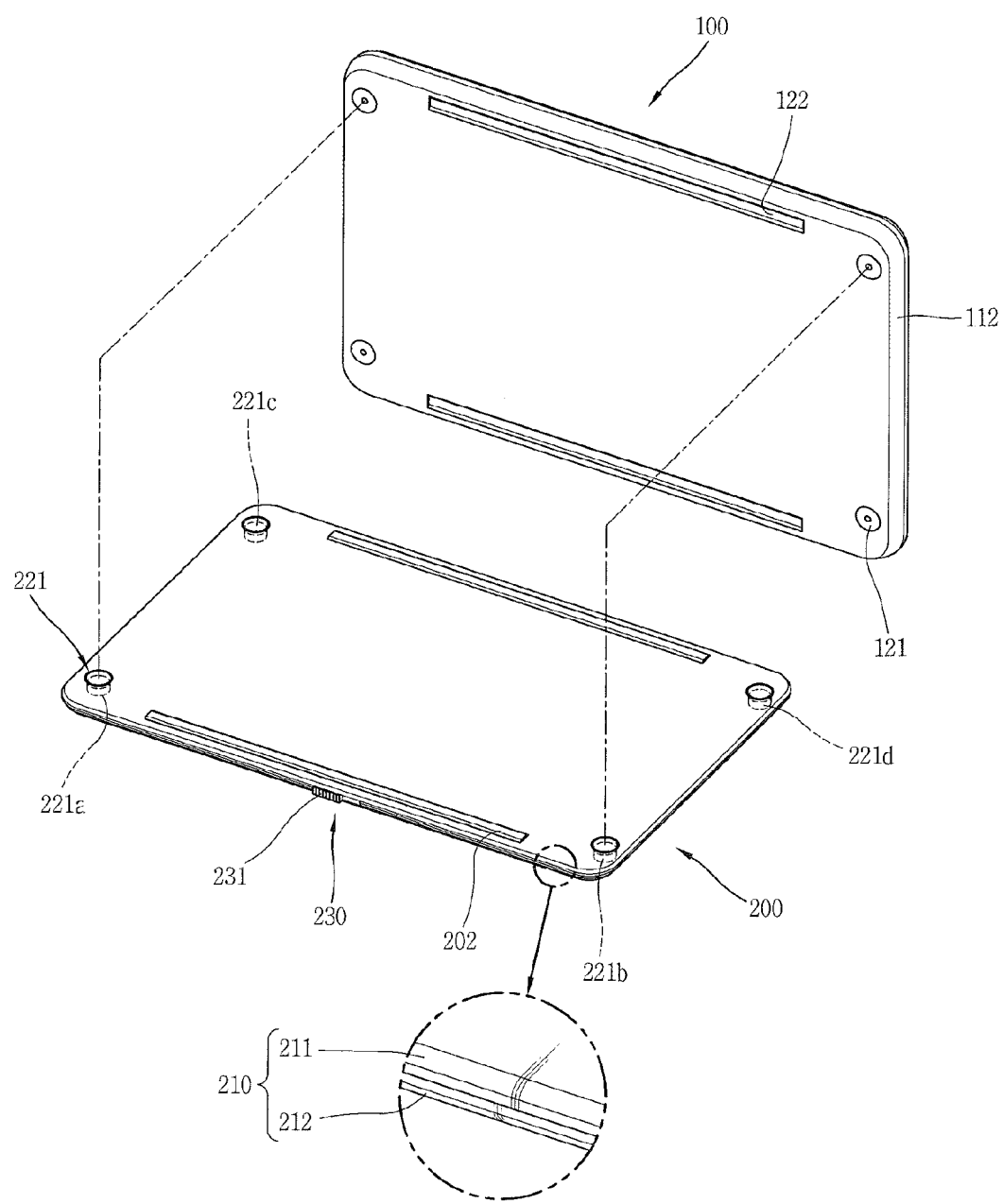
FIG. 3 is an assembled view showing that an expansion module is mounted to the mobile device of FIG. 1.

FIG. 3 is an assembled view showing that an expansion module 200 is mounted to the mobile device 100 of FIG. 1. As shown in FIG. 3, the expansion module 200 may detachably be coupled to the mobile device 100. The expansion module 200 may be an external battery for power supply to the mobile device 100, which is exemplarily shown in FIG. 3. The expansion module 200 may be electrically connected to the mobile device 100 to supply power to electronic components of the mobile device 100. The expansion module 200 may be configured to charge an internal battery of the mobile device 100.

Guide recesses 122 may be formed at the rear case 112 of the mobile device 100, and guide protrusions 202 matching the shape of the guide recesses 122 may be formed at a principal surface of the expansion module 200. Accordingly, the position where the expansion module 200 is attached to the mobile terminal 100 can be decided.

The expansion module 200 may include an expansion body 210, a magnet 221 and a movement converter 230. The expansion body 210 may be detachably coupled to one surface of the main body 110 of the mobile device 100. The expansion body 210 may be realized to be chargeable from the exterior and supply power to the mobile device 100.

When the expansion module 200 is coupled to the mobile device 100, the rear case 112 overlaps with one surface of the expansion module 200, i.e., with the principal surface of the expansion body 210. The expansion body 210 may form an installation space for electronic components by its front and rear cases 211 and 212. The front case 211 is coupled to the rear case 122 of the mobile device 100 by the coupling element 121. A plurality of coupling elements 121 may be provided near the corners of the rear case 122.

The magnets 221 may be present at the expansion body 210, and disposed in correspondence with the coupling elements 121 to apply a magnetic force to the coupling elements 121 when the expansion body 210 is coupled to the main body 110 of the mobile device 100. Consequently, the expansion module 200 is fixed due to the magnetic force upon being coupled to the mobile device 100. Also, metallic substances, separate from the coupling elements 121, may be disposed at the positions corresponding to the magnets 221.

When the coupling is done by magnetic coupling, there can be interference between the magnet of the expansion module and other electronic devices near the expansion module. To prevent such interference, the expansion module 200 may include a mesh structure (not shown) thereby forming a Faraday cage in regions where shielding of magnetic field is desirable. For example, the rear case 212 may have a mesh structure thereon to prevent magnetic field from leaking out through the rear case 212, thereby preventing interference between the expansion module and other electronic devices near the expansion module.

The movement converter 230 may be configured to move the magnet 221 in a direction opposite to the coupling element 121 (i.e., in a direction moving away from the coupling element 121) by manipulation for reduction of the magnetic force. Accordingly, a user would not be able to easily detach the expansion module 200, which is fixed by a strong magnetic force from the magnets 221, from the mobile device 100. The movement converter 230 can enable the user to easily detach the expansion module 200 by spacing the magnets 221 apart from the coupling element 121, thereby reducing the magnetic force.

A plurality of magnets 221 may be provided to correspond to the plurality of coupling elements 121, and part of the plurality of magnets 221 may be associated with the movement converter 230. For example, only some of magnets 221a and 221b adjacent to one side of the front case 211 may be moved by the movement converter 230, while the other magnets 221c and 221d adjacent to another side are fixed to the front case 211.

Figure 4:
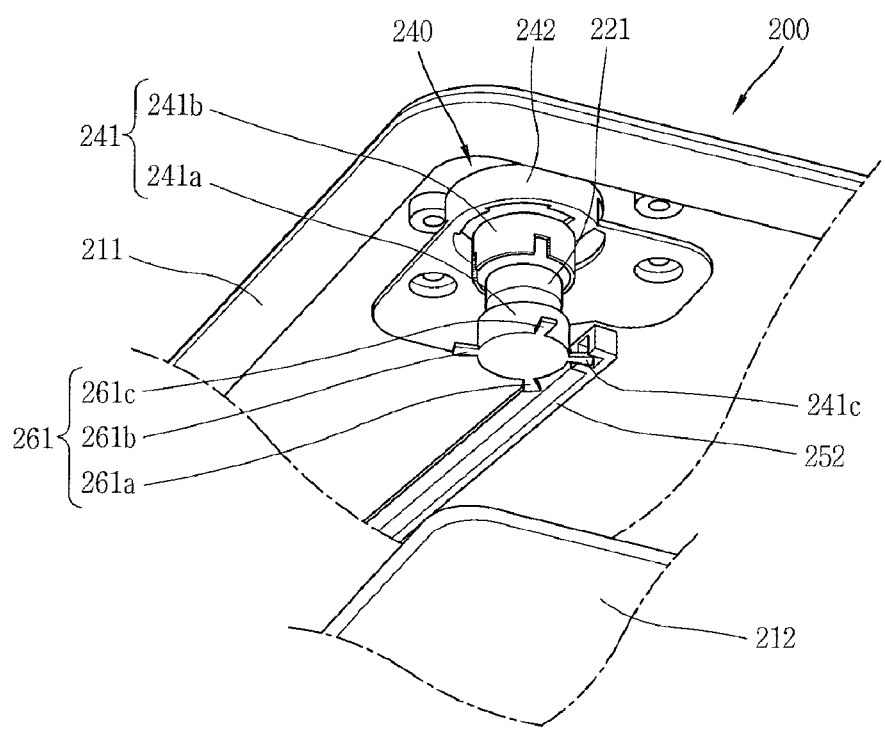
FIG. 4 is a partially exploded view of the expansion module of FIG. 3.
Figure 5:
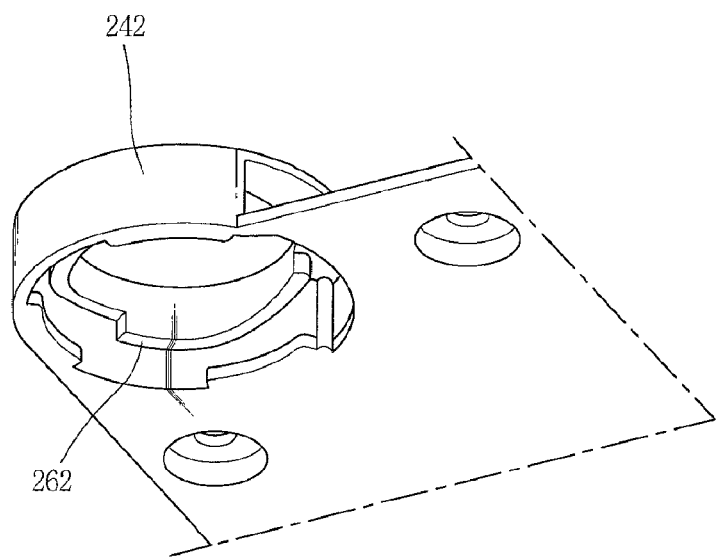
FIG. 5 is an enlarged view of a profile member of FIG. 4.

Hereinafter, a detailed configuration of the expansion module 200 will be described. FIG. 4 is a partially exploded view of the expansion module 200 of FIG. 3, FIG. 5 is an enlarged view of a profile member of FIG. 4, FIGS. 6A to 6C are partial sectional views showing coupling and separation between the mobile device 100 and the expansion module 200 of FIG. 3, and FIG. 7 is a planar view showing the movement converter 230 of FIG. 3.

As shown in FIGS. 4 to 7, sliding guiding units 240, which allow sliding of the magnets 221, may be provided at the expansion module 200. Each sliding guiding unit 240 may include a magnet case 241 and a hollow body 242.

The magnet case 241 may include first and second cases 241a and 241b, which form installation space for the magnet 221. The hollow body 242 may be mounted to the expansion body 210, and configured such that the magnet case 241 is slid toward or away from the coupling element 121 along an inner circumference. In particular, the magnet case 241 is inserted into the hollow body 242 to be guided along an inner circumferential surface of the hollow body 242, thereby being slid in an axial direction of the hollow body 242. In this exemplary embodiment, the hollow body 242 is mounted to the front case 211 of the expansion module 200 as a separate component. Alternatively, the hollow body 242 may be integrally formed with the front case 211 of the expansion module 200.

Figure 6A:
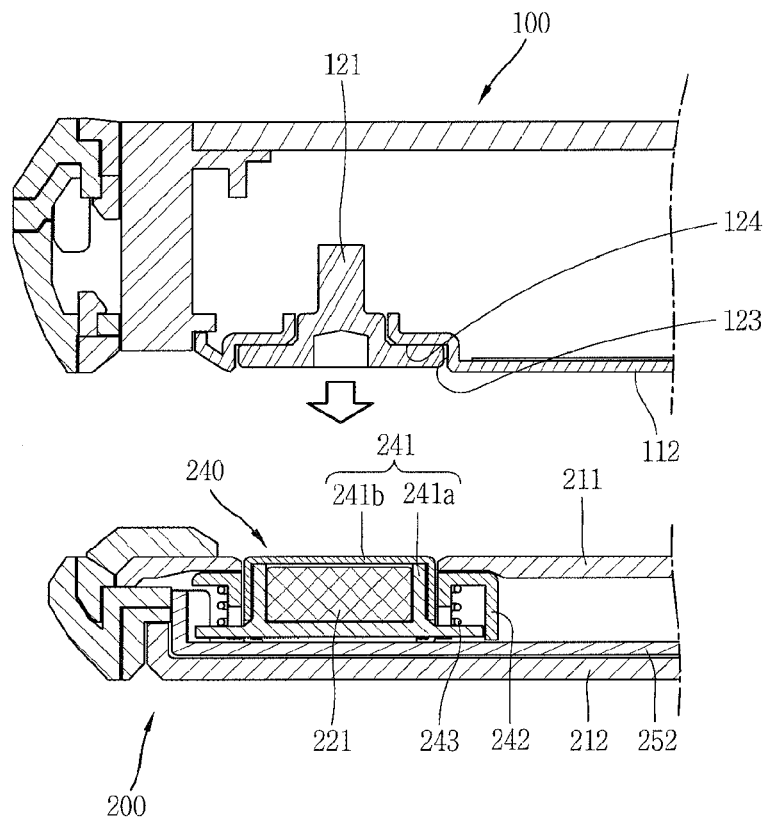
FIGS. 6A to 6C are partial sectional views showing coupling and separation between the mobile device and the expansion module of FIG. 3.
Figure 7:
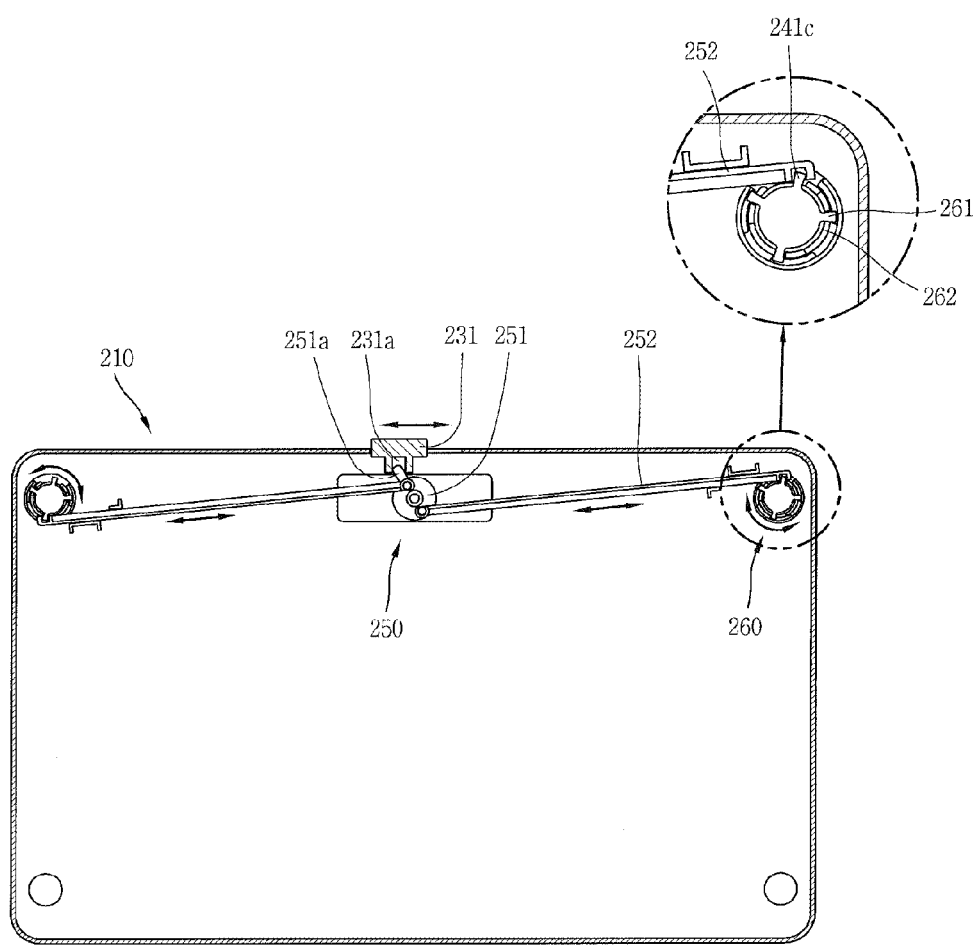
FIG. 7 is a planar view showing a movement converter of FIG. 3.

As shown in FIG. 6A, the sliding guiding unit 240 may include an elastic member 243. The elastic member 243 may support at least part of the magnet case 241 so as to apply an elastic force to the magnet case 241 in a direction opposite to the coupling element 121. In particular, the elastic member 243 may include a coil spring. The coil spring is disposed to cover an outer circumference of the magnet case 241. One end of the coil spring supports part of the hollow body 242 and another end supports an end portion of the magnet case 241.

FIG. 6A shows a detached state between the mobile device 100 and the expansion module 200. The elastic member 243 applies the elastic force to the magnet case 241 toward the inside of the expansion body 210. Accordingly, the magnet case 241 can be disposed without protruding from the hollow body 242 or the front case 211.

Figure 6B:
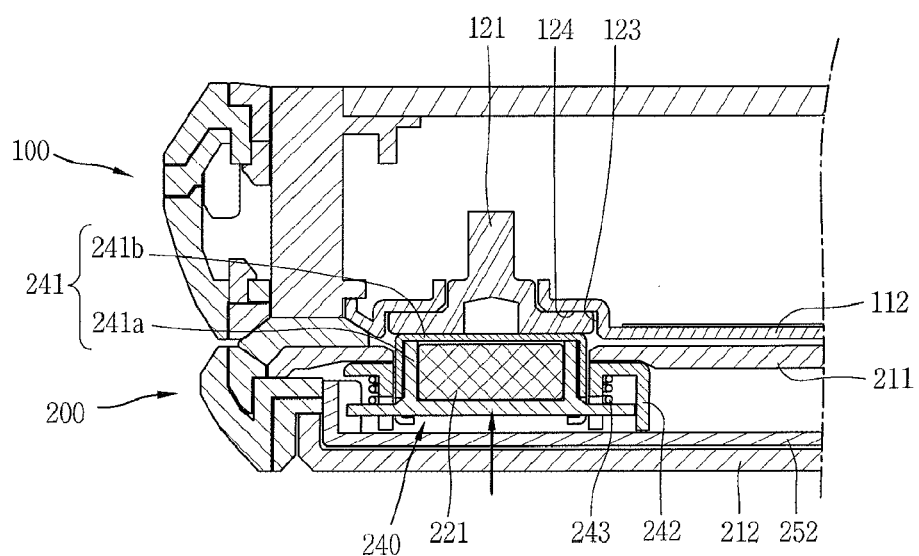

FIG. 6B shows a coupled state between the mobile device 100 and the expansion module 200. The magnet 221 is slid toward the coupling element 121 by the magnetic force between the magnet 221 and the coupling element 121 so that the magnet case 241 and the coupling element 121 come in contact with each other. Accordingly, the expansion module 200 can be fixed to the rear case 112 of the mobile device 100.

An insertion hole 123 for inserting the coupling element 121 therein may be formed at the rear case 112. The insertion hole 123 may have a stepped portion in an insertion direction. Accordingly, a reception portion 124 for receiving a head of the coupling element 121 therein is formed in the insertion hole 123. As shown in FIG. 6B, at least one of the magnet 221 and the magnet case 241 is partially inserted into the insertion hole 123 when the expansion module 200 is coupled to the mobile device 100. Hence, the coupling between the expansion module 200 and the mobile device 100 can be securer. Also, FIG. 6B exemplarily shows that the magnet case 241 is partially inserted into the insertion hole 123. However, at least part of the magnet 221 may be inserted into the insertion hole 123.

As shown in FIGS. 4 and 7, the movement converter 230 may include a manipulation member 231, a rotation generator 250, and a sliding generator 260. The manipulation member 231 may be disposed at one surface of the expansion body 210, and configured to be slidable along a side surface of the expansion body 210 in response to a user's manipulation. The rotation generator 250 may rotate the magnet 221 upon manipulation of the manipulation member 231. In particular, the rotation generator 250 may include a rotation plate 251 and a connection bar 252.

The rotation plate 251 may be configured such that at least part of its outer circumference is connected to the manipulation member 231, thereby being rotated responsive to sliding of the manipulation member 231. For example, a protrusion 251a is protruded from the outer circumference of the rotation plate 251 and inserted into a manipulation groove 231a of the manipulation member 231. Upon sliding of the manipulation member 231, an inner surface of the manipulation groove 231a presses the protrusion 251a. Accordingly a rotational force is applied to the rotation plate 251. Although not shown, there may be an elastic member (e.g. a spring) connected to the manipulation member that allows the manipulation member 231 to return to its original state when the manipulation member 231 is released.

The connection bar 252 may be configured such that one end thereof is connected to the rotation plate 251 and another end is connected to the magnet case 241 having the magnet 221 therein, thereby transferring the rotational force to the magnet 221. For example, the connection bar 252 is connected to a portion adjacent to the outer circumference of the rotation plate 251. Upon rotation of the rotation plate 251, the magnet case 241 is pulled or pushed due to the connection bar 252. As shown in FIG. 4, a connection protrusion 241c is protruded from an outer surface of the magnet case 241 in a radial direction of the magnet 221. The connection protrusion 241c is then connected to the connection bar 252. In particular, the connection protrusion 241c is formed at the first case 241a and a groove in which the connection protrusion 241c is inserted is formed at the second case 241b. When the connection bar 252 pulls or pushes the protrusion 241c, the magnet case 241 is responsively rotated about an axis of the magnet 221 along an inner circumference of a hollow portion of the hollow body 242.

As shown in FIGS. 4, 5 and 7, the sliding generator 260 rotates the magnet 221 and also move the magnet 221 in an axial direction of the rotation as the magnet 221 rotates. The sliding generator 260 may include a protrusion 261 and a profile member 262. The protrusion 261 may be protruded from an outer circumference of the magnet case 241, and provided in plurality. The plurality of protrusions 261a, 261b and 261c may be aligned on an outer circumference of the first case 241a, together with the connection protrusion 241c, with preset intervals. The second case 241b may have grooves in which the protrusions 261a, 261b and 261c are inserted. The protrusion 261 may be placed at the profile member 262. The profile member 262 may be formed to be slanted along the outer circumference of the magnet case 241 such that the magnet case 241 can be slid along in an axial direction of the rotation of the magnet 221, in response to the rotation of the protrusion 261.

As shown in FIG. 5, the profile member 262 may be formed at a surface adjacent to an opening of the hollow body 242. For example, the profile member 262 may be formed integrally with the hollow body 242, in a stepped form in a direction that the hollow body 242 is penetrated. Also, the profile member 262 may be formed to be gradually shorter or longer in height in the direction that the hollow body 242 is penetrated. Accordingly, the rotary motion of the protrusion 261 changes into a sliding motion of the magnet case 241.

Figure 6C:
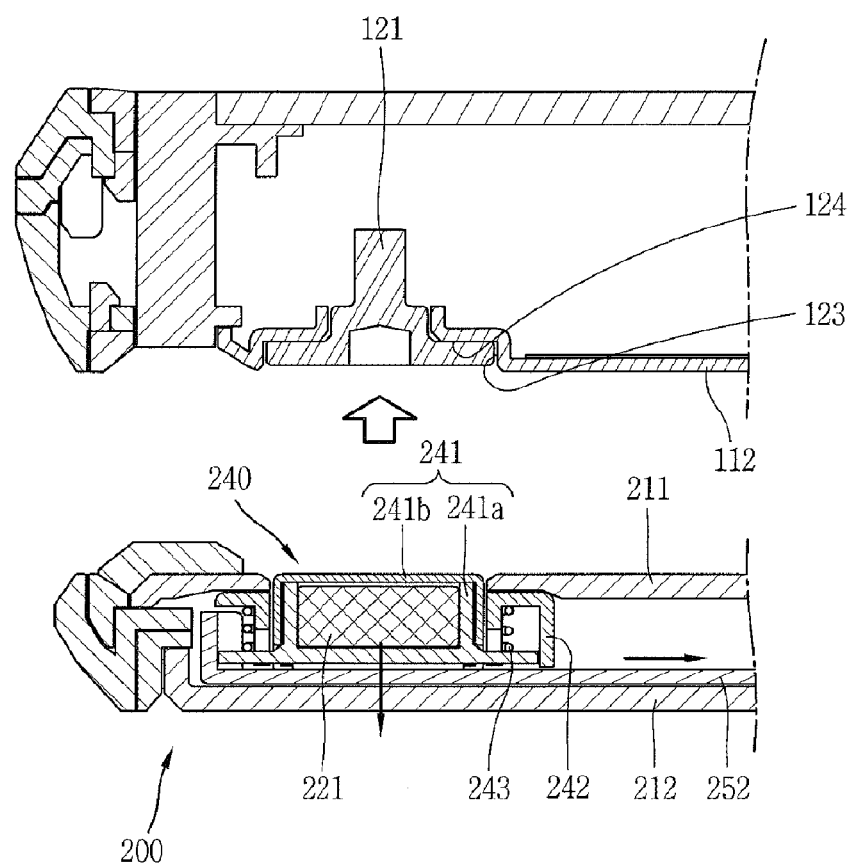

As shown in FIG. 6C, the movement of the connection bar 252 makes the magnet case 241 rotate. Accordingly, the magnet case 241 moves away from the coupling element 121. Here, the elastic member 243 applies an elastic force to the magnet case 241 to help move the magnet 221. The movement of the magnet case 241 results in attenuation of the magnetic force between the coupling element 121 and the magnet 221, which helps the user to easily separate the expansion module 200 from the mobile device 100.

Figure 8A:
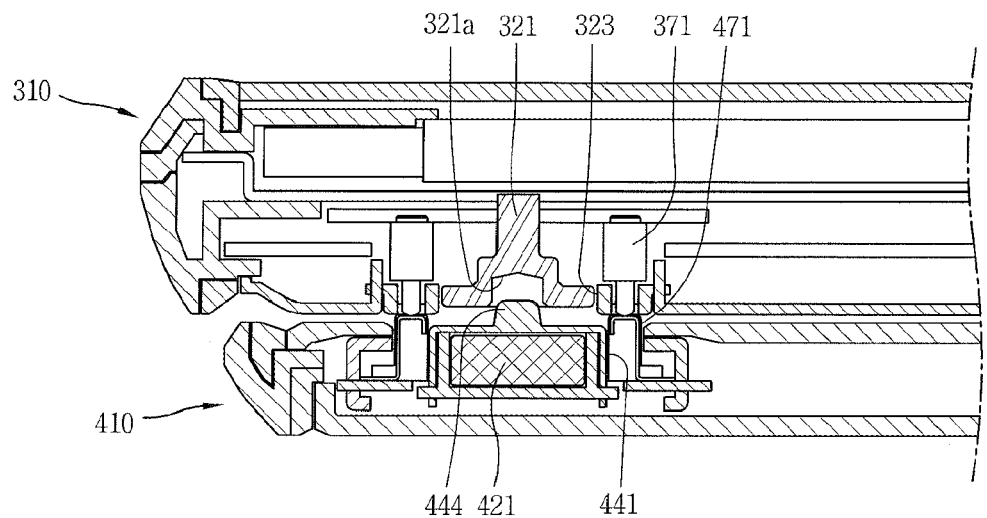
FIGS. 8A to 8C are a sectional view and enlarged views of a mobile device in accordance with another exemplary embodiment according to the present invention.
Figure 8B:
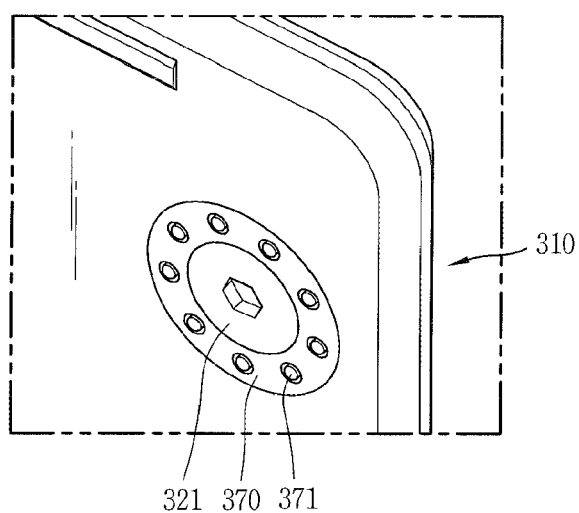
Figure 8C:
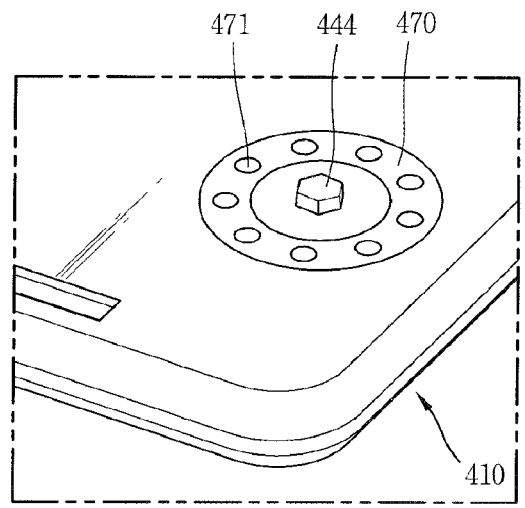

Hereinafter, an electric connection between the mobile device 100 and the expansion module 200 will be described. FIGS. 8A to 8C are a sectional view and enlarged views of a mobile device in accordance with another exemplary embodiment according to the present invention. In the drawings, the similar components as those in the previous embodiment will be understood by the foregoing description.

As shown in FIGS. 8A to 8C, a connection region 370 may be formed at one surface of a mobile device main body 310, and an expansion connection region 470 may be formed at an expansion body 410 of an expansion module so as to be electrically connected to the connection region 370 when the expansion body 410 is coupled to the mobile device main body 310. The connection region 370 is formed in an annular shape and a coupling element 321 is disposed inside the connection region 370. The connection region 370 may be less exposed by being configured to cover an outer circumference of the coupling element 321. The coupling element 321 may be provided in plurality. The connection region 370 may be configured to cover one of the plurality of coupling elements 321. In particular, as shown in FIG. 8A, an insertion hole 323 for inserting the coupling element 321 may be formed at a rear case, and the connection region 370 may define an opening of the insertion hole 323.

As shown in FIGS. 8A to 8C, the expansion connection region 470 may be configured to cover a magnet 421. The magnet 421 may be provided in plurality. The expansion connection region 470 may be configured to cover one of the plurality of magnets 421 so as to match the connection region 370.

Interfaces for exchange of data and/or power between the main body 310 and the expansion body 410 may be disposed at the connection region 370 and the expansion connection region 470, respectively. The interfaces may include connection terminals 371 and 471. When the expansion body 410 is coupled to the main body 310, end portions of the connection terminals 371 and 471 are protruded from the connection region 370 and the expansion connection region 470, respectively, so as to elastically press each other. For example, the connection terminals 371 of the connection region 370 may act as pogo pins, and the connection terminals 471 of the expansion connection region 470 may act as C-clips.

A protrusion 444 may be formed at one surface of the magnet case 441. A groove 321a corresponding to the protrusion 444 may be disposed at the coupling element 321. For example, the protrusion 444 is protruded from an externally exposed surface of the magnet case 441. The protrusion 444 is inserted into the groove 321a when the magnet case 441 is slid by the magnetic force between the coupling element 321 and the magnet 421. Such structure can ensure a secure coupling between the mobile device and the expansion module.

Figure 9A:
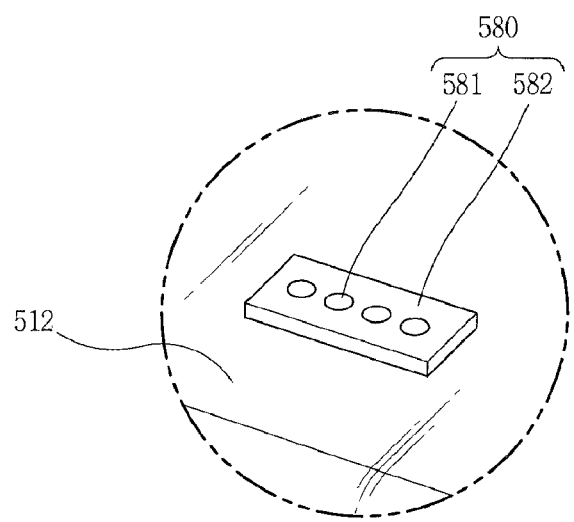
FIGS. 9A and 9B are enlarged views of a mobile device in accordance with another exemplary embodiment according to the present invention.
Figure 9B:
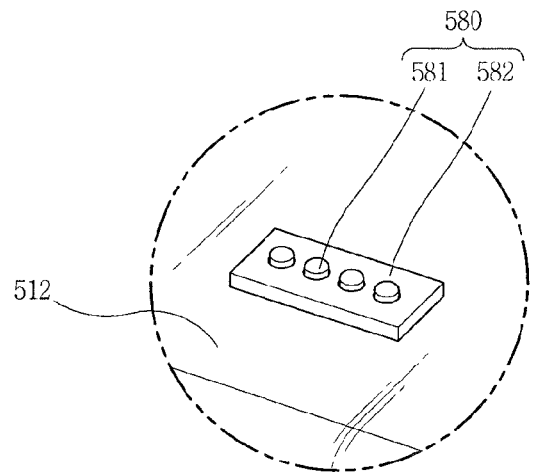

FIGS. 9A and 9B are enlarged views of a mobile device in accordance with another exemplary embodiment of the present invention. As shown in FIGS. 9A and 9B, a connection unit 580 may be formed at a rear case 512 of a mobile device, and include connection terminals 581 and a shielding portion 582.

The connection terminals 581 may be protruded from one surface of the main body 510 to be electrically connected to an expansion body (not shown). The shielding portion 582 may be formed to cover the connection terminals 581. The shielding portion 582 may be configured to be pushable between a position exposing side portions of the connection terminals 581 and a position shielding the side portions of the connection terminals 581. For example, the shielding portion 582 may be elastically pushable. When the expansion module is coupled to the mobile device, the shielding portion 582 is pressed by the front case of the expansion module, as shown in FIG. 9B, thereby exposing the side portions of the connection terminals 581.

This exemplary embodiment illustrates that the connection unit 580 is spaced apart from the coupling element. However, the present invention may not be limited to this configuration. For example, the connection unit 580 may also be formed at the connection region 370 (see FIG. 8A). In this configuration, the connection terminals may be exposed when the shielding portion is moved by the expansion connection region 470 (see FIG. 8B) in a pressing manner, thereby achieving an electric connection to the connection terminals of the expansion connection region 470.

Figure 10:
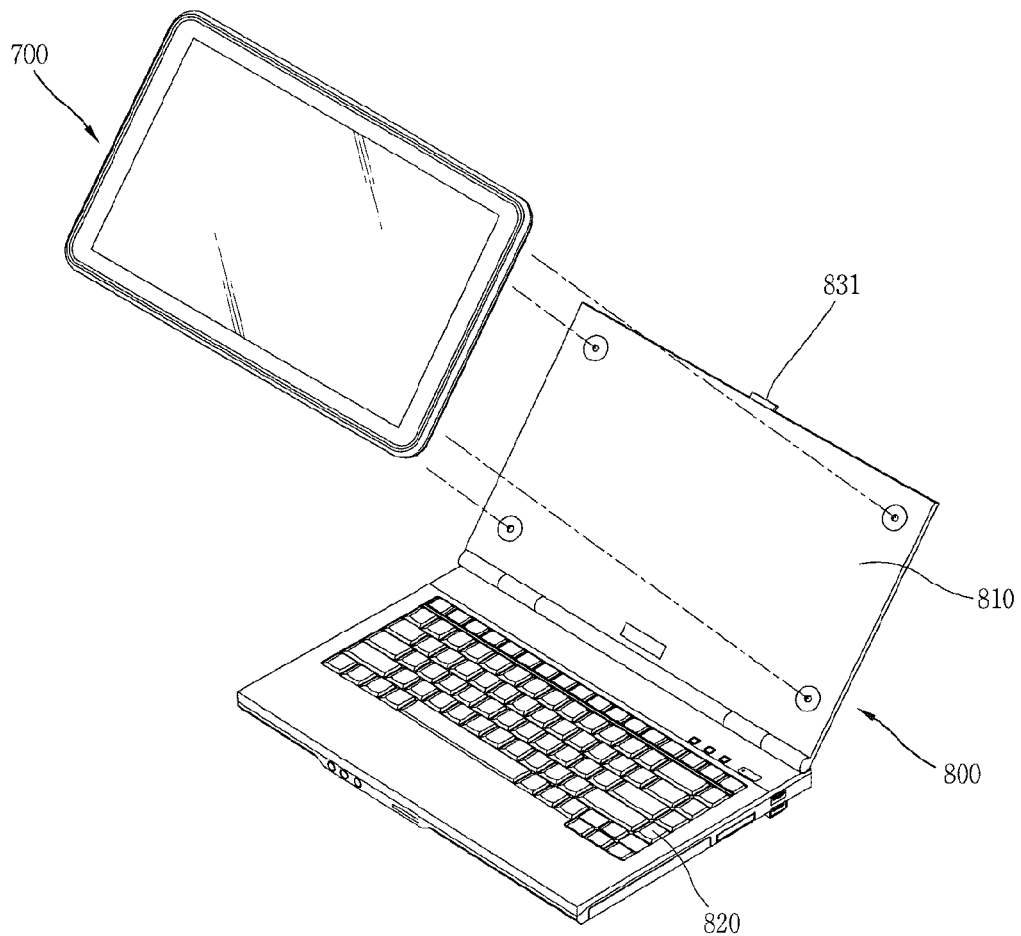
FIG. 10 is an assembled view of a mobile device in accordance with another exemplary embodiment according to the present invention.

FIG. 10 is an assembled view of a mobile device in accordance with another exemplary embodiment according to the present invention. An expansion module 800 according to this embodiment may include a holder 810 and an input device 820. The holder 810 may be coupled to a mobile device 700. The holder 810 may include magnets, sliding guiding units, and a movement converter which have been described in the previous embodiment.

The input device 820 may be aligned to intersect the holder 810 and allow input of a control command to the mobile device 700. A manipulation member 831 may be present at one side surface, e.g., a horizontal side surface of the holder 810. The electric connection between the mobile device 700 and the expansion module 800 may be formed by interfaces for data exchange. This configuration may allow power supply to the mobile device 700 via the interfaces.

Figure 11A:
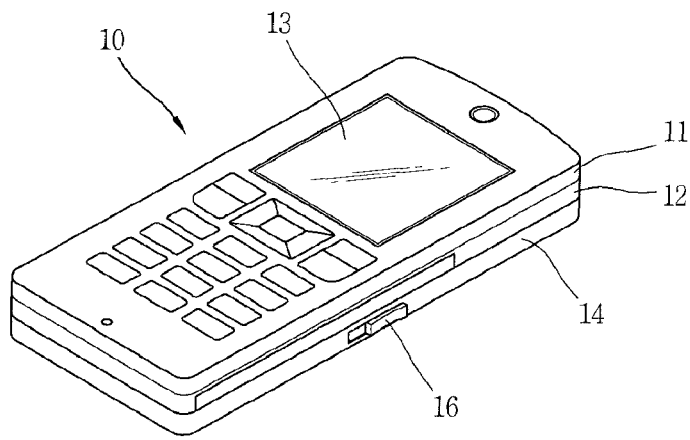
FIGS. 11A and 11B are a perspective view and an assembled view of a mobile terminal in accordance with another exemplary embodiment according to the present invention.
Figure 11B:
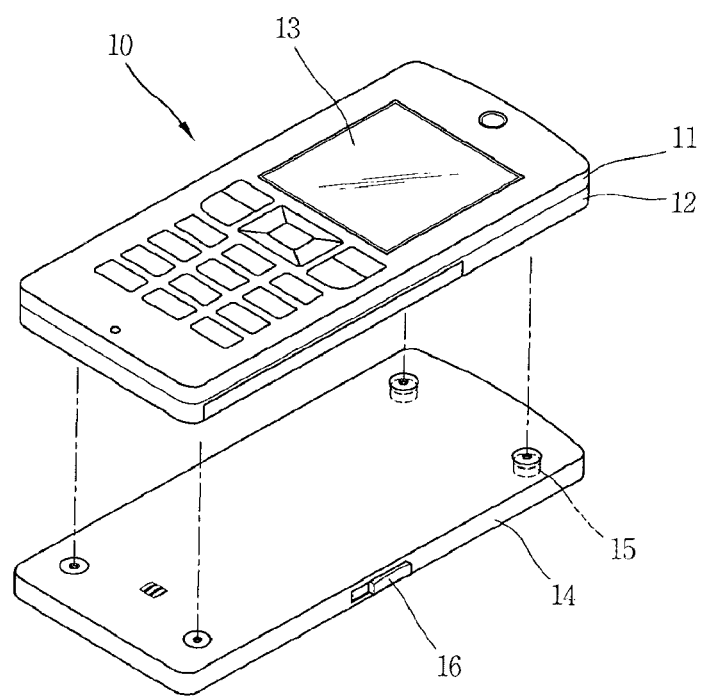

FIGS. 11A and 11B are a perspective view and an assembled view of a mobile terminal in accordance with another embodiment according to the present invention. In the drawings, a mobile device may include mobile terminals having a wireless communication function. A mobile terminal 10 according to the present invention may not be limited to a bar type as shown herein, but it may be applicable to various types, such as a slide type, a folder type, a swing type and the like. The mobile terminal 10 may include a display unit 13 on a front case 11 thereof and a detachable battery 14 on a rear case 12 thereof. The detachable battery 14 may be the expansion module described in the previous embodiments.

Coupling elements (not shown) may be mounted at the rear case 12. Magnets 15 may be slidably attached onto the battery 14. Upon attaching the magnets 15 onto the coupling elements, the battery 14 is coupled to the rear case 12. A manipulation member 16 may be present at one side of the battery 14. The magnets may be moved away from the coupling elements by the sliding guiding units and the movement converter, which have been described in the previous embodiment, in response to the manipulation of the manipulation member 16. The battery 14 may accordingly be detached from the rear case 12.

As described so far, with the configuration of the expansion module according to the present invention, the sliding of the magnets can realize a detachable mechanism which facilitates the coupling and separation between the main body of the mobile device and the expansion module. Also, the present invention can realize an electric connection between the expansion module and the mobile device by use of adjacent regions of the coupling elements, thereby implementing a connection mechanism which is less externally exposed.

Although an exemplary embodiment wherein magnetic force between the magnet of the expansion module and the coupling element of the mobile device is used to achieve a simplified detachable structure was demonstrated in detail, other structures may be used in accordance with the present invention. For example, the expansion module and the mobile device may both have coupling elements. In particular, the first coupling element disposed at the expansion module can be configured to be coupled to a second coupling element disposed at the mobile device. In this exemplary embodiment, the first coupling element may be a magnet while the second coupling element is a metallic substance as shown in FIGS. 6A-6B and FIG. 8A.

In another exemplary embodiment, the first coupling element and the second coupling elements can both be a first magnet and a second magnet, respectively. In this case, the first and second magnets can be configured such that the first magnet attracts the second magnet in a first state while the first magnet repels the second magnet in a second state. For example, the second state can be a state wherein the second magnet is rotated by 180 degrees from the first state. In particular, the first magnet can have N/S polarity while the second magnet has S/N polarity in the first state so that the first magnet attracts the second magnet when the second magnet is placed on the first magnet. By rotating the second magnet 180 degrees, the first magnet will maintain N/S polarity while the second magnet changes its polarity to N/S, resulting in the first magnet repelling the second magnet thereon. In this exemplary embodiment, the manipulation member disposed at the expansion module can be configured to decouple the first coupling element and the second coupling element by converting a linear motion of the manipulation member to a rotary motion of the second coupling element, thereby rendering the first state into the second state.

In another exemplary embodiment, the first coupling element can be configured to mechanically (rather than by magnetic force) latch the second coupling element in a coupled state. In this exemplary embodiment, the manipulation member disposed at the expansion module can be configured to decouple the first coupling element and the second coupling element by converting a linear motion of the manipulation member to a rotary motion of the second coupling element.

It will be apparent to those skilled in the art that various modifications and variations can be made in the module for expanding a function of a mobile device and a mobile device having the same of the present invention without departing from the spirit or scope of the invention. Thus, it is intended that the present invention cover the modifications and variations of this invention provided they come within the scope of the appended claims and their equivalents.

What is claimed is:

1. A mobile device comprising:
a main body having a metallic element mounted thereon; and
an expansion module electrically connected to the main body,
wherein the expansion module comprises:
a holder configured to be coupled to the main body;
a magnet mounded at the holder and disposed to apply a magnetic force to the metallic element to couple the expansion module with the main body; and
an input device configured to allow input of a control command to the main body when the main body is coupled to the holder of the expansion module.

2. The device of claim 1, wherein the coupling element comprises a metallic substance with a groove that is aligned to correspond to a protrusion formed on a magnet case including the magnet.

3. The device of claim 1, further comprising:
a connection region formed at the main body, and
an expansion connection region formed at the expansion module, the expansion connection region being electrically connected to the connection region when the main body is coupled to the expansion module.

4. The device of claim 3, wherein interfaces for exchange of data or power between the main body and the expansion module are provided, respectively, at the connection region and the expansion connection region.

5. The device of claim 4, wherein the interfaces comprise connection terminals disposed in the connection region and the expansion connection region, respectively, wherein connection terminals is configured to elastically press each other when the expansion module is coupled to the main body.

6. The device of claim 3, wherein the main body comprises an insertion hole in which the metallic element is inserted and wherein at least part of the magnet or part of a magnet case having the magnet therein is inserted into the insertion hole when the expansion module is coupled to the main body.

7. The device of claim 1, wherein the main body includes a connection unit comprising:
   a plurality of connection terminals protruding from the main body; and
   a shielding portion surrounding the connection terminals wherein the shielding portion is configured to be pressed when the main body is coupled to the expansion module so as to expose the connection terminals thereby achieving an electric connection between the connection terminals and the expansion module.

8. The device of claim 1, wherein the expansion module further comprise a sliding guiding unit configured to allow sliding of the magnet.

9. The device of claim 8, wherein the sliding guiding unit comprises:
   a magnet case having the magnet therein; and
   a hollow body configured to allow the magnet case to slide toward or away from the metallic element.

10. The device of claim 9, wherein the sliding guiding unit further comprises an elastic member configured to support at least part of the magnet case so as to apply an elastic force to the magnet case in a direction opposite to the metallic element.

11. The device of claim 8, wherein the hollow body is mounted to the expansion module and a profile member is formed at a surface adjacent to the opening of the hollow body.

12. The device of claim 1, further comprising a movement converter configured to move the magnet away from the coupling element so as to decrease the magnetic force between the coupling element and the magnet thereby decoupling the main body from the expansion module, wherein the movement converter comprises:
   a manipulation member disposed at a side of the expansion module;
   a rotation generator configured to rotate the magnet when the manipulation member is manipulated; and
   a sliding generator configured to slide the magnet along an axial direction of a rotation of the magnet when the magnet rotates.

13. The device of claim 12, wherein the rotation generator comprises:
   a rotation plate wherein at least part of an outer circumference of the rotation plate is connected to the manipulation member so as to be rotated; and
   a connection bar having one end connected to the rotation plate and another end connected to a magnet case including the magnet.

14. The device of claim 12, wherein the sliding generator comprises:
   a protrusion protruded from an outer circumference of the magnet case; and
   a profile member at which the protrusion is placed, the profile member being slanted along the outer circumference of the magnet case such that the magnet case is slid in the axial direction when the protrusion rotates.

15. The device of claim 1, wherein the main body comprises a front case having a display unit and a rear case configured to couple to one surface of the expansion module, wherein the metallic element is a metallic substance disposed at the rear case of the main body.

16. The device of claim 1, wherein the expansion module further comprises an external battery to supply power to the main body when the main body is coupled to the expansion module.

17. An expansion module for a mobile device comprising:
   an expansion body detachably coupled to one surface of the mobile device;
   a magnet disposed at the expansion body to apply a magnetic force to a coupling element in the mobile device thereby coupling the expansion body with the mobile device; and
   a movement converter configured to move the magnet away from the coupling element so as to decrease the magnetic force between the coupling element and the magnet thereby decoupling the mobile device from the expansion body, wherein the movement converter comprises:
   a manipulation member disposed at the expansion body;
   a rotation generator configured to rotate the magnet when the manipulation member is manipulated; and
   a sliding generator configured to slide the magnet along an axial direction of a rotation of the magnet when the magnet rotates.

* * * * *

UNITED STATES PATENT AND TRADEMARK OFFICE
CERTIFICATE OF CORRECTION

PATENT NO. : 8,300,389 B2  
APPLICATION NO. : 12/857913  
DATED : October 30, 2012  
INVENTOR(S) : Laio Kang et al.

Page 1 of 1

It is certified that error appears in the above-identified patent and that said Letters Patent is hereby corrected as shown below:

IN THE CLAIMS:

In claim 1, column 10, line 45, change "mounded" to --mounted--.

In claim 2, column 10, line 51, change "the coupling element" to --the metallic element--.

In claim 12, column 11, lines 37-38 and line 39, change "the coupling element" to --the metallic element--, each occurrence.

Signed and Sealed this  
Tenth Day of June, 2014

Michelle K. Lee  
*Deputy Director of the United States Patent and Trademark Office*